United States Patent
Chen

(10) Patent No.: US 12,199,965 B2
(45) Date of Patent: Jan. 14, 2025

(54) QUANTUM BLOCK-CHAINED AUTHENTICATION SYSTEM AND METHODS FOR DATA TRANSMISSION PASSING THROUGH P2P NETWORKS

(71) Applicant: AhP-Tech Inc., New Taipei (TW)

(72) Inventor: Chao-Huang Chen, New Taipei (TW)

(73) Assignee: AhP-Tech Inc., New Taipei (TW)

(*) Notice: Subject to any disclaimer, the term of this patent is extended or adjusted under 35 U.S.C. 154(b) by 218 days.

(21) Appl. No.: 17/992,940

(22) Filed: Nov. 23, 2022

(65) Prior Publication Data
US 2024/0171559 A1 May 23, 2024

(51) Int. Cl.
H04L 9/40 (2022.01)

(52) U.S. Cl.
CPC .......... *H04L 63/08* (2013.01); *H04L 63/1416* (2013.01)

(58) Field of Classification Search
CPC ..... H04L 63/061; H04L 63/062; H04L 63/08; H04L 63/12; H04L 63/1416; H04L 9/08; H04L 9/0852; H04L 9/0816
See application file for complete search history.

(56) References Cited

U.S. PATENT DOCUMENTS

| | | | |
|---|---|---|---|
| 7,974,221 B2 * | 7/2011 | Tamassia | H04L 67/104 370/408 |
| 11,275,859 B2 * | 3/2022 | Shrinivasan | G06F 21/6245 |
| 11,677,738 B1 * | 6/2023 | Stapleton | G06N 10/00 713/164 |
| 11,824,976 B1 * | 11/2023 | Shea | H04L 9/0852 |
| 11,831,624 B2 * | 11/2023 | Verzun | H04L 63/102 |
| 11,895,232 B1 * | 2/2024 | Stapleton | H04L 9/3226 |
| 11,902,431 B1 * | 2/2024 | Carter, Jr. | G06F 16/252 |
| 11,949,782 B1 * | 4/2024 | Shea | H04L 9/0852 |
| 11,995,194 B1 * | 5/2024 | Shea | G06F 21/602 |
| 12,010,224 B2 * | 6/2024 | Stapleton | H04L 9/0631 |
| 12,069,186 B2 * | 8/2024 | Maganti | H04L 9/3249 |

* cited by examiner

*Primary Examiner* — Hosuk Song

(57) ABSTRACT

A quantum block-chained authentication solution with quantum authentication processes for data transmissions passing through a peer-to-peer (P2P) network including a plurality of agent nodes comprises a system that is capable of not only performing a smart contract on a block-chained virtual-machine mechanism for transmitting a data from an agent node to another agent node passing through a plurality of paths in a secure way implemented via proprietary quantum authentication processes, but also detecting and reacting to a malicious behavior within a transmission in time.

7 Claims, 5 Drawing Sheets

Native Determined
States $N \equiv 1 (\mod 3) \rightarrow |\pi/2\rangle$
$N \equiv 2 (\mod 3) \rightarrow |\pi/3\rangle$
$N \equiv 0 (\mod 3) \rightarrow |\pi/4\rangle$

FIG. 2A

Quantum Key Formed with Pure States

| Q-bits | Native | Relative | DDP | Final |
|---|---|---|---|---|
| 1st | $|\pi/2\rangle$ | $|3\pi/2\rangle$ | 0.26 | $|3\pi/2\rangle$ |
| 2nd | $|\pi/4\rangle$ | $|7\pi/4\rangle$ | 0.23 | $|\pi/4\rangle$ |
| 3rd | $|\pi/2\rangle$ | $|3\pi/2\rangle$ | 0.22 | $|\pi/2\rangle$ |
| 4th | $|\pi/3\rangle$ | $|5\pi/3\rangle$ | 0.29 | $|5\pi/3\rangle$ |

FIG. 2B

Quantum Key Formed with Mixed States $|\Psi\rangle = C_1^2|3\pi/2\rangle + C_2^2|\pi/4\rangle + C_3^2|\pi/2\rangle + C_4^2|5\pi/3\rangle$ $C_1^2 + C_2^2 + C_3^2 + C_4^2 = 1$ $\rightarrow C_{11}^2 + C_{12}^2 + C_{13}^2 + C_{14}^2 = 1$
$C_{21}^2 + C_{22}^2 + C_{23}^2 + C_{24}^2 = 1$
$C_{31}^2 + C_{32}^2 + C_{33}^2 + C_{34}^2 = 1$
$C_{41}^2 + C_{42}^2 + C_{43}^2 + C_{44}^2 = 1$ $A = \begin{bmatrix} C_{11}^2 & C_{12}^2 & C_{13}^2 & C_{14}^2 \\ C_{21}^2 & C_{22}^2 & C_{23}^2 & C_{24}^2 \\ C_{31}^2 & C_{32}^2 & C_{33}^2 & C_{34}^2 \\ C_{41}^2 & C_{42}^2 & C_{43}^2 & C_{44}^2 \end{bmatrix}$

FIG. 2C

14 Q-bits for a Quantum Authentication Key

| q-bit-1st | q-bit-2nd | q-bit-3rd | q-bit-4th | q-bit-5th | q-bit-6th | q-bit-7th | q-bit-8th |
|---|---|---|---|---|---|---|---|
| $\|3\pi/2\rangle$ | $\|\pi/4\rangle$ | $\|\pi/2\rangle$ | $\|5\pi/3\rangle$ | $\|\pi/3\rangle$ | $\|\pi/4\rangle$ | $\|\pi/2\rangle$ | $\|\pi/3\rangle$ |

$======== |\phi^+\rangle =========== |\phi^+\rangle$

| q-bit-9th | q-bit-10th | q-bit-11th | q-bit-12th | q-bit-13th | q-bit-14th |
|---|---|---|---|---|---|
| $\|\pi/2\rangle$ | $\|\pi/2\rangle$ | $\|\pi/3\rangle$ | $\|\pi/2\rangle$ | $\|\pi/3\rangle$ | $\|7\pi/4\rangle$ |

$============ |\phi^+\rangle$

FIG. 2D

Native Determined States & Relative Phasing States

| Native | Relative |
|---|---|
| $\|\pi/2\rangle$ | $\|3\pi/2\rangle$ |
| $\|\pi/3\rangle$ | $\|5\pi/3\rangle$ |
| $\|\pi/4\rangle$ | $\|7\pi/4\rangle$ |

FIG. 2E

Derivation of an 8-bit Binary Number $3/7 = 0.428571428571428\overline{6}$
$428571428571428\overline{6} \rightarrow 00011100011100000_2$
the first 8 bits: $00011100_2$

FIG. 2F

QUANTUM BLOCK-CHAINED AUTHENTICATION SYSTEM AND METHODS FOR DATA TRANSMISSION PASSING THROUGH P2P NETWORKS

BACKGROUND OF THE INVENTION

1. Field of the Invention

The present invention relates to a quantum block-chained authentication system and methods, and in particular, to a system and methods with quantum authentication processes for data transmission passing through a peer-to-peer (P2P) network including a plurality of agent nodes; the system is capable of not only performing a smart contract on an Ethereum Virtual Machine (EVM) mechanism for transmitting data from an agent node to another agent node passing through a plurality of paths in a secure way with quantum authentication processes, but also detecting malicious behavior within a transmission in time.

2. Description of the Related Art

There are usually cyber-security issues with conventional P2P networks. However, applications implemented with P2P networks actually perform efficiently and conveniently in aspects of data transmissions. Thus, new methodology to counter cyber-security issues for data transmissions passing through P2P networks is required.

Therefore, it is desirable to develop an applicable authentication solution with a system and specific methods to reduce cyber-security risks for data transmissions passing through P2P networks. Utilizing innovative methodology on both a conventional Quantum Key Distribution (QKD) technology and a block-chained eco-system will help a lot in the related requirements.

BRIEF SUMMARY OF THE INVENTION

In view of the drawbacks of the prior art, it is an object of the present invention to provide a high-strength authentication solution operating on a P2P network composed of a plurality of agent nodes. Here an agent node means a node which is capable of performing a consensus mechanism of a block-chained system to launch or be involved in a transaction. The high-strength authentication solution includes a block-chained system and specific authentication processes not only to perform quantum authentication processes on an agent node for transmissions distributed by a transaction, but also to enhance capability of detecting malicious behavior within a transmission in time.

To achieve the above objects and more, the present invention provides an authentication system and methods for data transmission passing through a peer-to-peer (P2P) network including a plurality of agent nodes. Based on the related methods implemented for authenticating data transmissions passing through a P2P network, each agent node is established by: configuring each agent node as a chained virtual machine (for example, an Ethereum Virtual Machine) attached to a specific P2P network; implementing a consensus mechanism for each chained virtual machine, wherein the consensus mechanism is capable of performing transactions of data transmission between the agent nodes; performing a set of quantum authentication processes while receiving a data block distributed for a data transmission which is launched by a transaction based on the consensus mechanism (for example, via executing a smart contract); and determining whether to retransmit a data block, recover a data block, or cancel a corresponding data transmission, in accordance with the results derived from the quantum authentication processes. According to the above-mentioned, a quantum block-chained authentication system for data transmission passing through a P2P network including a plurality of agent nodes is provided by the present invention; wherein each agent node implements an Ethereum Virtual Machine (EVM) sub-system and a Quantum Processing Unit (QPU) integration sub-system.

In an embodiment, the EVM sub-system performs quantum authentication processes with Quantum Key Distribution (QKD) application for transactions regarding to data transmissions from an agent node to another agent node. Besides, the QPU integration sub-system is coupled to the EVM sub-system to support applicable quantum computing for the quantum authentication processes. The QPU integration sub-system comprises a quantum-computing-simulation module, a quantum-circuits-simulation module, and a quantum-machine-learning module. The quantum-computing-simulation module provides a corresponding Quantum Processing Unit (QPU) service according to data encoding length based on Huffman coding for facilitating quantum computing (for example, supporting longer encoding length with service provided by more QPUs). The quantum-circuits-simulation module provides a neuro network implemented with q-bits for simulating variation of a Shannon entropy regarding to data blocks to be transmitted from an agent node to another agent node. The quantum-machine-learning module implements machine learning with high performance quantum-circuits simulators to collaborate with the quantum-circuits-simulation module for inferring malicious behavior based on the simulated variation of a Shannon entropy. Thereby, the system is capable of performing a smart contract on an EVM mechanism for transmitting data from a source agent node to a destination agent node passing through a plurality of paths in a secure way performed by quantum authentication processes, meanwhile the system is also capable of detecting malicious behavior within a transmission in time.

It is to be noted that the mentioned modules within the corresponding sub-systems in the present invention are equivalent to a set of software libraries or instructions formed with a plurality of compiled functions executed by a processor and can be re-accessed for performing a series of processes step by step.

Further, in order to implement the above-mentioned quantum authentication processes in an efficient way, the following operations should be provided by an agent node: for each q-bit of a quantum key to be derived, adopting a true random number to determine a corresponding state from a plurality of candidate pure quantum states (for example, having $|\pi/2\rangle$, $|\pi/3\rangle$, and $|\pi/4\rangle$ as candidate pure quantum states) and then set the determined state into the current q-bit, thereby getting a combination of pure quantum states (for example, getting 4 q-bits corresponding to determined pure states of $|\pi/2\rangle$, $|\pi/4\rangle$, $|\pi/2\rangle$, and $|\pi/3\rangle$); for a set of native determined q-bits of a quantum key to be derived, utilizing a Dirichlet distribution function to derive a series of numbers expressed for probabilities according to the length of the quantum key (for example, deriving numbers of 0.26, 0.23, 0.22, and 0.29; these are Dirichlet distributed probabilities for a 4 q-bits quantum key) so as to determine whether the final state of each q-bit is the native determined quantum state or its relative phasing state (for example, based on average probability 0.25, q-bit-1st and q-bit-4th adopt relative phasing states while q-bit-2nd and q-bit-3rd adopt native determined states), thereby getting another combination of pure quantum states (for example, getting states of $|3\pi/2\rangle$, $|\pi/4\rangle$, $|\pi/2\rangle$, and $|5\pi/3\rangle$ as a final state); utilizing a combination of pure quantum states to form a quantum key including a set of q-bits expressed as a set of pure single quantum states standing for a mixed quantum state (for example, $|\psi\rangle = C_1^2|3\pi/2\rangle + C_2^2|\pi/4\rangle + C_3^2|\pi/2\rangle + C_4^2|5\pi/3\rangle$ while $C_1^2 + C_2^2 + C_3^2 + C_4^2 = 1$); performing a Bell test (Relevance verification based on $|P_{xz} - P_{zy}| \leq 1 + P_{xy}$) to determine the local realism of a quantum key for confirming that there is no unknown variable to interfere with the local system; adopting a quantum key as an authentication key and distributing the authentication key from a source agent node to a destination agent node via utilizing a generic QKD protocol while the authentication key is delivered by single photons within a single optical channel; for the authentication key formed with single pure quantum states, performing a consensus mechanism according to a configured partition length to convert the authentication key into a form of Bell states, so as to express the form with binary bits (for example, leveraging each two neighboring q-bits that are entangled states of a native phase and a relative phase; refer to more details disclosed in the detailed description of the present invention) as a parameter to be processed with a corresponding data block based on a configured block size, thereby getting a hash value to be recorded on a transaction-verification hash table maintained by each agent node; for the authentication key formed with a mixed quantum state, according to a configured partition length, performing a consensus mechanism to derive a linear combination of probabilities based on the mixed quantum state, so as to be processed with a corresponding data block based on a configured block size (for example, deriving a set of linear combinations recursively to get a matrix A, and leveraging an eigen vector $\chi$ from the encodings of the corresponding data block) thereby getting an eigen value to be expressed as a hash value recorded on a transaction-verification hash table maintained by each agent node; performing a consensus mechanism to derive a Shannon entropy corresponding to a data block based on a configured block size and the Shannon entropy will be recorded in a transaction-Shannon entropy table maintained by each agent node; and via tracing the transaction-verification hash table and the transaction-Shannon entropy table, determining whether a data block distributed by a data transmission launched by a transaction based on a consensus mechanism was tampered with.

In the same embodiment, in order to perform the above-mentioned operations effectively, the present invention implements an EVM sub-system comprising a polarization-state-generator module, a quantum-key-distribution module, a consensus-record module, and a quantum-key-update module. The polarization-state-generator module for the agent node generates a set of polarization states as a component of a quantum key to be distributed. The quantum-key-distribution module distributes the quantum key derived from the polarization-state-generator module via utilizing a generic QKD protocol while the quantum key is delivered by single photons within a single optical channel. The consensus-record module for the agent node performs the quantum authentication processes according to a consensus mechanism of the EVM thereby updating an authentication result to a transaction-authentication hash table in order to determine whether a transmitted data was tampered with in time. The quantum-key-update module collaborates with the polarization-state-generator module to update the quantum key before starting a new transaction or after determining that a transmitted data was tampered with.

Further, in an embodiment, in order to enhance the derivation of quantum state for an authentication key, the polarization-state-generator module is implemented including the following operations: for each q-bit of a quantum key to be derived, utilizing a true random number generator (for example, a quantum random number generator) to determine a polarization state from multiple candidate polarization pure states and then set the determined polarization state into the current q-bit; and for a set of native determined q-bits of a quantum key to be derived, utilizing a Dirichlet-distribution-function generator to derive a series of numbers expressed for probabilities according to the length of the quantum key thereby determining that the final state of each q-bit is the native determined polarization state or its relative phasing state.

Moreover, in an embodiment, in order to facilitate the distribution of a quantum authentication key, the quantum-key-distribution module is implemented including the following operations: performing a Bell test to determine the local realism of a quantum key for confirming that there is no unknown variable to interfere with the local system; distributing a quantum key formed with a combination of multiple single pure polarization states wherein the quantum key is delivered by single photons within a single optical channel; and distributing a quantum key formed with a combination of multiple q-bits expressing for mixed polarization states.

Moreover, in the same embodiment, in order to facilitate quantum authentication processes with transactions regarding to data transmissions, the consensus-record module of each agent node is implemented including the following operations: utilizing a quantum random number as a parameter to derive a plurality of paths based on a consensus mechanism provided by the EVM sub-system and a data will be distributed into the paths for transmissions from an agent node to another agent node (for example, deriving four paths including node #1-node #2-node #6, node #1-node #3-node #6, node #1-node #4-node #6, and node #1-node #5-node #6 for data transmissions from node #1 to node #6); collaborating with the polarization-state-generator module to get a quantum key formed with a combination of multiple pure single polarization states as an authentication key for data transmissions and coupled to the quantum-key-distribution module to distribute the authentication key to each agent node on the paths for transmissions from a source agent node to another destination agent node; collaborating with the polarization-state-generator module to get a quantum key formed with a combination of multiple pure single polarization states for deriving a mixed state to be an authentication key for data transmissions and coupled to the quantum-key-distribution module to distribute the authentication key to each agent node on the paths for transmissions from a source agent node to another destination agent node, wherein the corresponding coefficient to each single pure state of the mixed state is determined by a normalization process according to corresponding observed probabilities; for the authentication key formed with single pure polarization states, performing a consensus mechanism according to a configured partition length to convert the authentication key into a form of Bell states, so as to express the form with binary bits as a parameter to be processed with a corresponding data block based on a configured block size, thereby getting a hash value to be recorded on a transaction-verification hash table maintained by each agent node; for the authentication key formed with a mixed polarization state, according to a configured partition length, performing a consensus mechanism to derive a linear combination of probabilities based on the mixed polarization state, so as to be processed with a corresponding data block based on a configured block size, thereby getting an eigen value to be expressed as a hash value recorded on a transaction-verification hash table maintained by each agent node; performing a consensus mechanism to derive a Shannon entropy corresponding to a data block based on a configured block size for the data transmission of a transaction, and the Shannon entropy will be recorded in a transaction-Shannon entropy table maintained by each agent node; and via tracing the transaction-verification hash table and the transaction-Shannon entropy table, determining whether or not a data block of data transmission between agent nodes based on a consensus mechanism was tampered with.

Still in the same embodiment, in order to facilitate determining whether to retransmit a data block, recover a data block, or cancel a corresponding data transmission, each agent node is enhanced by: determining to retransmit a data block for a transaction of data transmission if a corresponding transaction-verification hash is mismatched and a Shannon entropy of the corresponding data block encoded by Huffman code was changed within a threshold range during a transmission; determining to recover a data block for a transaction of data transmission if a corresponding transaction-verification hash is mismatched and a Shannon entropy of the corresponding data block encoded by Huffman code was changed over a threshold range during a transmission; and if a corresponding transaction-verification hash keeps being mismatched meanwhile a Shannon entropy of the corresponding data block encoded by Huffman code keeps being changed over a threshold range during re-transmissions, determining to cancel a transaction of data transmission and replace the current configured data encoding based on a consensus mechanism.

BRIEF DESCRIPTION OF THE DRAWINGS

FIG. 2A is a state table of native determined states regarding methods for quantum authentication according to an embodiment of the present invention.

FIG. 2B is a state table of quantum key formed with pure states regarding methods for quantum authentication according to an embodiment of the present invention.

FIG. 2C is a state table of quantum key formed with mixed states regarding methods for quantum authentication according to an embodiment of the present invention.

FIG. 2D is a state table of 14 Q-bits for a quantum authentication key regarding methods for quantum authentication according to an embodiment of the present invention.

FIG. 2E is a state table of native determined states and relative phasing states regarding methods for quantum authentication according to an embodiment of the present invention.

FIG. 2F is a diagram of derivation of an 8-bit binary number regarding methods for quantum authentication according to an embodiment of the present invention.

DETAILED DESCRIPTION OF THE INVENTION

To facilitate understanding of the objects, characteristics, dataflow, and effects of this present disclosure, embodiments together with the attached drawings for the detailed description of the present disclosure are provided.

A plurality of embodiments in regard to a quantum authentication system with specific methods or operations for data transmission passing through a peer-to-peer (P2P) network is provided as follows. In some embodiments, the present invention is implemented as an agent system including a plurality of agent nodes of a shared peer-to-peer (P2P) network with technology in the combination of an EVM sub-system, and a QPU integration sub-system. Accordingly, through introducing a set of quantum authentication processes into the shared P2P network composed of the above-mentioned sub-systems, a quantum authentication agent system will be capable of supporting chained virtual machines based on a consensus mechanism to perform a smart contract for transmitting a data from an agent node to another agent node passing through a plurality of paths in a secure way with quantum authentication processes and detecting malicious behavior within a transmission in time.

Figure 1A:
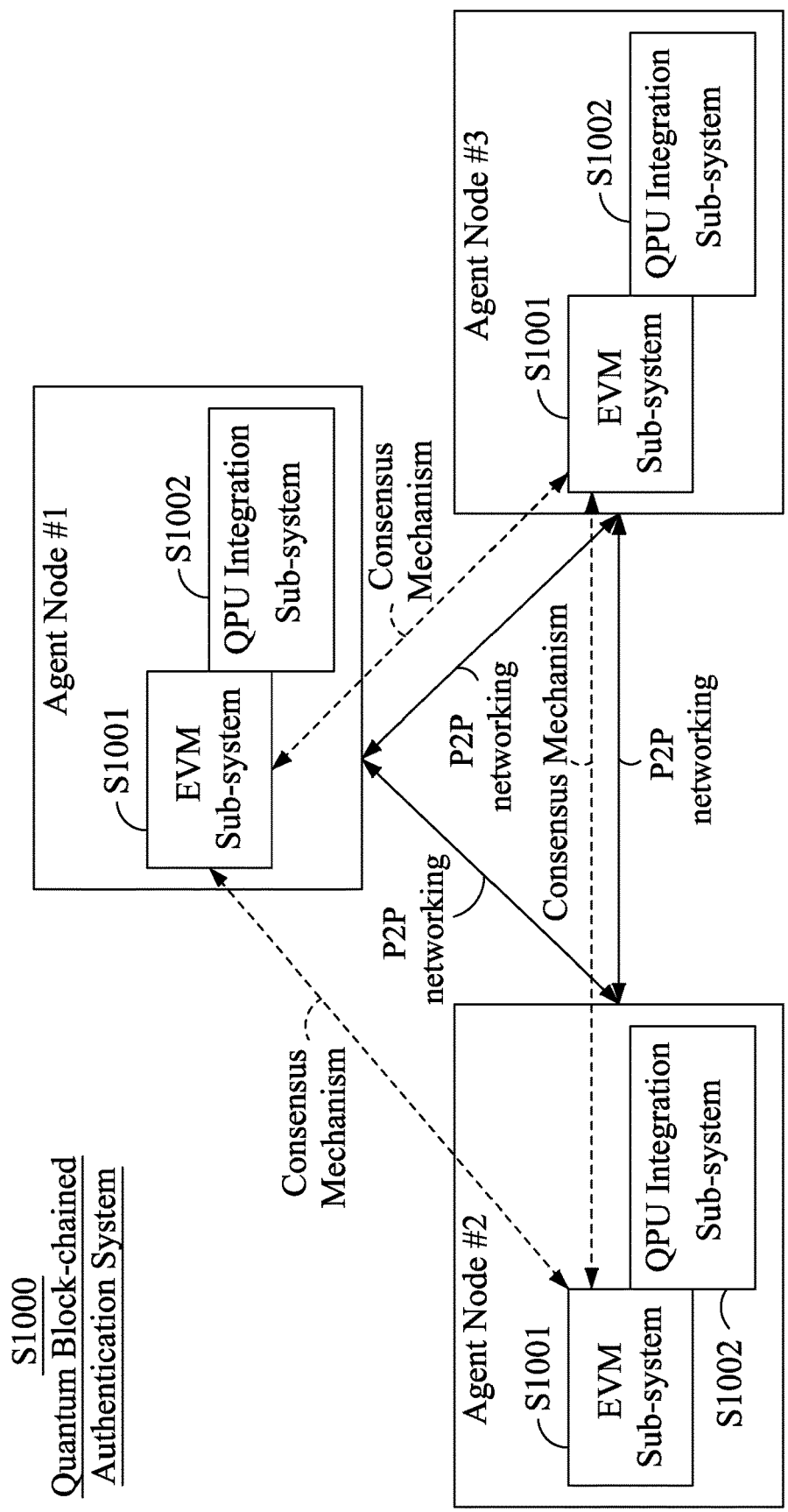
FIG. 1A is a structural block diagram of a user scenario to implement a quantum block-chained authentication system according to an embodiment of the present invention.

Referring to FIG. 1A, in some embodiments, this technology establishes a quantum block-chained authentication system S1000 for data transmission passing through a peer-to-peer (P2P) network including a plurality of agent nodes (shown as Agent Node #1-Agent Node #3 in FIG. 1A); wherein each agent node implements an Ethereum Virtual Machine (EVM) sub-system S1001 and a QPU integration sub-system S1002; wherein the EVM sub-system S1001 performs quantum authentication processes with a Quantum Key Distribution (QKD) application for transactions regarding to data transmissions from an agent node to another agent node, and the QPU integration sub-system S1002 is coupled to the EVM sub-system S1001 to support applicable quantum computing for the quantum authentication processes.

In order to implement such a quantum block-chained authentication system S1000 based on specific methods for authenticating data transmissions passing through a P2P network, each agent node is established by: configuring each agent node as a chained virtual machine (for example, an Ethereum Virtual Machine, EVM) attached on a specific P2P network; implementing a consensus mechanism for each chained virtual machine, wherein the consensus mechanism is capable of performing transactions of data transmission between the agent nodes; performing a set of quantum authentication processes while receiving a data block distributed for a data transmission which is launched by a transaction based on the consensus mechanism (for example, executing a smart contract on the EVM); and determining whether to retransmit a data block, recover a data block, or cancel a corresponding data transmission, in accordance with the results derived from the quantum authentication processes. According to the above-mentioned, a quantum block-chained authentication system S1000 for data transmission passing through a P2P network including a plurality of agent nodes is provided by the present invention; wherein each agent node implements an Ethereum Virtual Machine (EVM) sub-system S1001 and a QPU integration sub-system S1002.

The EVM sub-system performs quantum authentication processes with Quantum Key Distribution (QKD) application for transactions regarding data transmissions from an agent node to another agent node. Besides, referring to FIG.

1B, in an embodiment, the QPU integration sub-system S1002 is coupled to the EVM sub-system S1001 to support applicable quantum computing for the quantum authentication processes. The QPU integration sub-system S1002 comprises a quantum-computing-simulation module M201, a quantum-circuits-simulation module M202, and a quantum-machine-learning module M203. The quantum-computing-simulation module M201 provides a corresponding Quantum Processing Unit (QPU) service according to data encoding length based on Huffman coding for facilitating quantum computing (for example, supporting longer encoding length with service provided by more QPUs). In some applicable practices, to support a function of data recovery for some valuable data transmissions, the present invention introduces technology of Huffman coding with corresponding variable lengths to each data block to be transmitted. Thus, the quantum-computing-simulation module M201 will help on calling an applicable QPU service and storing each Huffman coding of data characters as a mixed quantum state on the cloud (for example, via AWS solutions such as Amazon Bracket Service SV001, Pasqal QUBEC Service SV002, and Oxford Quantum Circuits SV003 as shown in FIG. 1B), thereby M201 will help on coordinating a proper QPU service on hand for facilitating a data recovery process if needed.

Figure 1B:
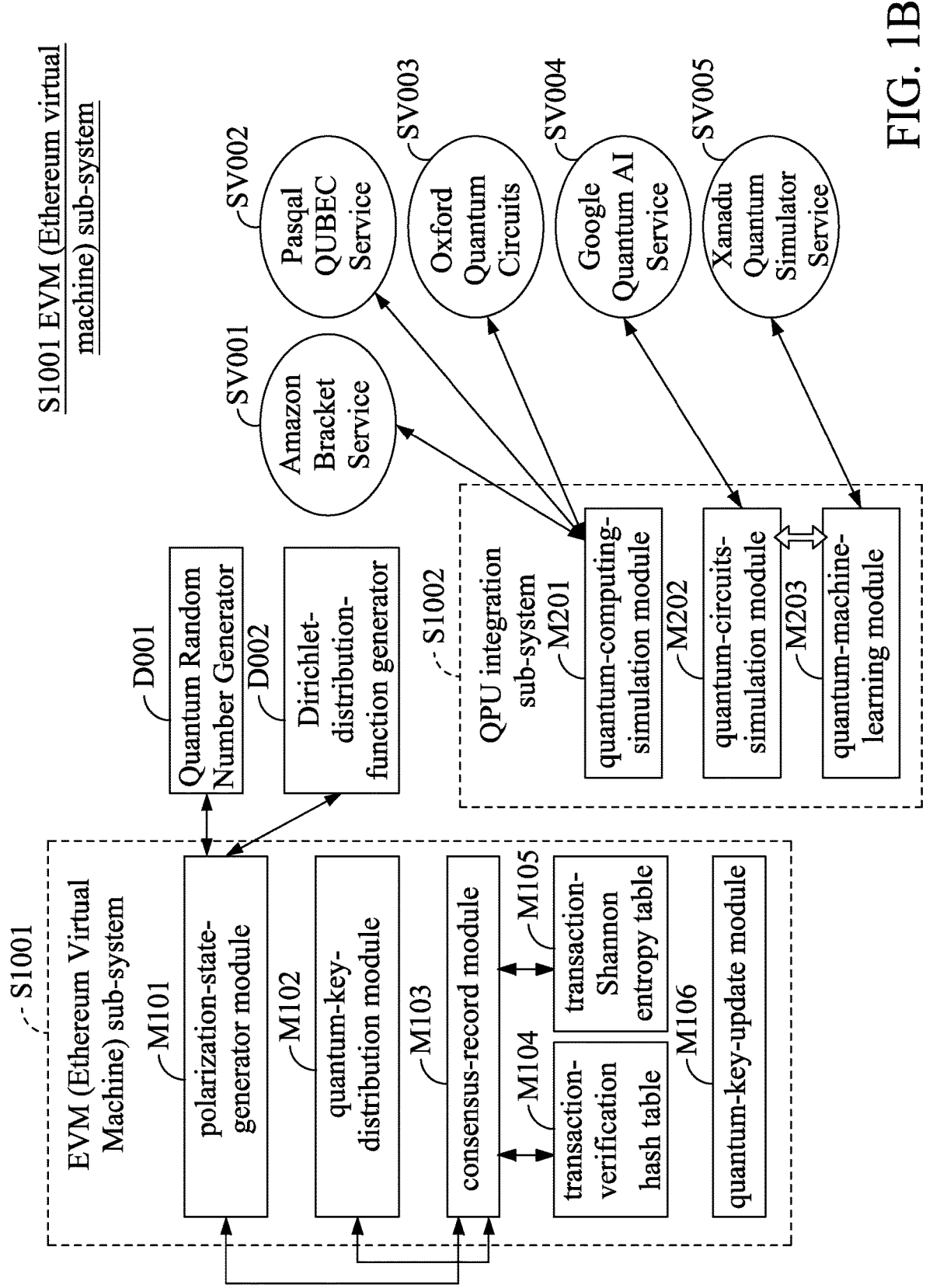
FIG. 1B is a structural block diagram of an agent node within a quantum block-chained authentication system according to an embodiment of the present invention.

In the same embodiment, still referring to FIG. 1B, wherein the above-mentioned quantum-circuits-simulation module M202 provides a neuro network implemented with q-bits for simulating variation of a Shannon entropy (H(X) $=\Sigma_i P(\chi_i)\log_b P(\chi_i)$) regarding data blocks to be transmitted from an agent node to another agent node. In some applicable practices, to support a function of inferring the variation of the current Shannon entropy regarding specific data blocks, the quantum-circuits-simulation module M202 will help on calling an applicable cloud AI service (such as Google Quantum AI Service SV004 shown in FIG. 1B) for simulating the variation of a Shannon entropy through a cloud neuro network.

In the same embodiment, still referring to FIG. 1B, wherein the above-mentioned quantum-machine-learning module M203 implements machine learning with high performance quantum-circuits simulators to collaborate with the quantum-circuits-simulation module M202 for inferring malicious behavior based on the simulated variation of a Shannon entropy. In some applicable practices, to support a function of inferring malicious behavior based on the simulated variation of a Shannon entropy, the quantum-machine-learning module M203 will help on calling an applicable cloud photon processor specific for a usage of quantum machine learning (such as Xanadu Quantum Simulator Service SV005 shown in FIG. 1B). Thereby, based on the cooperation of the EVM sub-system S1001 and the QPU integration sub-system S1002, the system is capable of performing a smart contract on an EVM mechanism for transmitting a data from a source agent node to a destination agent node passing through a plurality of paths in a secure way performed by quantum authentication processes, meanwhile the system is also capable of detecting malicious behavior within a transmission in time.

Further, referring to FIGS. 2A-2C, in order to implement the above-mentioned quantum authentication processes in an efficient way, the following operations should be provided by an agent node: for each q-bit of a quantum key to be derived, adopting a true random number to determine a corresponding state from a plurality of candidate pure quantum states and then set the determined state into the current q-bit, thereby getting a combination of pure quantum states; for example, as the block of "Native Determined States" shown in FIG. 2A, $|\pi/2\rangle$, $|\pi/3\rangle$, and $|\pi/4\rangle$ are available native pure states, and a native determined state can be derived from a random number N mod 3; based on such idea, referring to the block of "Quantum Key Formed with Pure States" shown in FIG. 2B as an example, if we get true random numbers 1, 3, 4 and 8, the native determined states will be $|\pi/2\rangle$, $|\pi/4\rangle$, $|\pi/2\rangle$, and $|\pi/3\rangle$ those are corresponding to 4 q-bits.

Still referring to FIGS. 2A-2C, for a set of native determined q-bits of a quantum key to be derived, utilizing a Dirichlet distribution function to derive a series of numbers expressed for probabilities according to the length of the quantum key (for example, as shown in the field of "DDP" within the block of "Quantum Key Formed with Pure States", deriving numbers of 0.26, 0.23, 0.22, and 0.29; (these are Dirichlet distributed probabilities for a 4 q-bits quantum key) so as to determine whether the final state of each q-bit is the native determined quantum state or its relative phasing state (for example, based on an average probability 0.25, letting q-bit-1st and q-bit-4th adopt relative phasing states such as $|3\pi/2\rangle$ and $|5\pi/3\rangle$ while q-bit-2nd and q-bit-3rd adopt native determined states such as $|\pi/4\rangle$ and $|\pi/2\rangle$ ), thereby getting another combination of pure quantum states (for example, as shown in the field of "Final" within the block of "Quantum Key Formed with Pure States", getting the four states of $|3\pi/2\rangle$, $|\pi/4\rangle$, $|\pi/2\rangle$, and $|5\pi/3\rangle$ as a final state).

Still referring to FIGS. 2A-2C, utilizing a combination of pure quantum states to form a quantum key including a set of q-bits expressed as a set of pure single quantum states standing for a mixed quantum state (for example, as shown in the block of "Quantum Key Formed with Mixed States", a mixed state such as $|\psi\rangle = C_1^2|3\pi/2\rangle + C_2^2|\pi/4\rangle + C_3^2|\pi/2\rangle + C_4^2|5\pi/3\rangle$ while $C_1^2 + C_2^2 + C_3^2 + C_4^2 = 1$); performing a Bell test (Relevance verification based on Bell inequality $|P_{xz} - P_{zy}| \le 1 + P_{xy}$) to determine the local realism of a quantum key for confirming that there is no unknown variable to interfere with the local system; adopting a quantum key as an authentication key and distributing the authentication key from a source agent node to a destination agent node via utilizing a generic QKD protocol while the authentication key is delivered by single photons within a single optical channel.

Referring to FIGS. 2D-2F, for the authentication key formed with single pure quantum states (for example, as shown in the block of "Native Determined States & Relative Phasing States", $|\pi/2\rangle$, $|\pi/3\rangle$, and $|\pi/4\rangle$ are the native determined states while $|3\pi/2\rangle$, $|5\pi/3\rangle$, and $|7\pi/4\rangle$ are relative phasing states, letting the 14 single pure quantum states shown in the block of "14 Q-bits for a Quantum Authentication Key" as the 14 q-bits for the authentication key) performing a consensus mechanism according to a configured partition length to convert the authentication key into a form of Bell states, so as to express the form with binary bits (for example, as shown in the block of "14 Q-bits for a Quantum Authentication Key", leveraging each two neighboring q-bits those are entangled states of a native phase and a relative phase and treating them as a Bell state $|\Phi^+\rangle$ ; deriving the proportion of the counts of $|\Phi^+\rangle$ ; as the case shown in FIGS. 2D-2F, based on the 3 counts of $|\Phi^+\rangle$ from 7 pairs of q-bits, getting the proportion P=3/7=0.4285714285714286; for each digit on the right-hand side, replacing the digital number as 0 if the corresponding number is even, or replacing it with 1 if the corresponding number is odd; as shown in the block of "Derivation of an 8-bit Binary Number", thus getting an 8-bit binary number $00011100_2$ if the configured partition length is 8 bits) as a parameter to be processed with a corresponding data block based on a configured block size through a hash function, thereby getting a hash value to be recorded on a transaction-verification hash table maintained by each agent node.

Referring to FIGS. 2A-2C again, for the authentication key formed with a mixed quantum state, according to a configured partition length (for example, length of 4-bits), performing a consensus mechanism to derive a linear combination of probabilities based on the mixed quantum state, so as to be processed with a corresponding data block based on a configured block size (for example, as shown in the block of "Quantum Key Formed with Mixed States", deriving a set of linear combinations recursively to get a matrix A, and leveraging an eigen vector $\chi$ from the encodings of the corresponding data block; thus having $A\chi=\lambda\chi$) thereby getting an eigen value $\lambda$ to be expressed as a hash value recorded on a transaction-verification hash table maintained by each agent node; performing a consensus mechanism to derive a Shannon entropy ($S=-k\Sigma_i P_i \log P_i$) corresponding to a data block based on a configured block size and the Shannon entropy will be recorded in a transaction-Shannon entropy table maintained by each agent node; and via tracing the transaction-verification hash table and the transaction-Shannon entropy table, determining whether or not a data block distributed by a data transmission launched by a transaction based on a consensus mechanism was tampered with.

Referring to FIG. 1B again, in the same embodiment, in order to perform the above-mentioned operations effectively, the present invention further implements the EVM sub-system S1001 comprising a polarization-state-generator module M101, a quantum-key-distribution module M102, a consensus-record module M103, and a quantum-key-update module M106. The polarization-state-generator module M101 for the agent node generates a set of polarization states as a component of a quantum key to be distributed. The quantum-key-distribution module M102 distributes the quantum key derived from the polarization-state-generator module M101 via utilizing a generic QKD protocol while the quantum key is delivered by single photons within a single optical channel. The consensus-record module M103 for the agent node performs the quantum authentication processes according to a consensus mechanism of the EVM thereby updating an authentication result to a transaction-authentication hash table M104 in order to determine whether or not a transmitted data was tampered with in time. The quantum-key-update module M106 collaborates with the polarization-state-generator module M101 to update the quantum key before starting a new transaction or after determining that a transmitted data was tampered with.

Still referring to FIG. 1B, further, in an embodiment, in order to enhance the derivation of quantum state for an authentication key, the polarization-state-generator module M101 is implemented including the following operations: for each q-bit of a quantum key to be derived, utilizing a true random number generator (for example, a quantum random number generator D001) to determine a polarization state from multiple candidate polarization pure states and then set the determined polarization state into the current q-bit (as the same example explained with FIGS. 2A-2C); and for a set of native determined q-bits of a quantum key to be derived, utilizing a Dirichlet-distribution-function generator D002 to derive a series of numbers expressed for probabilities according to the length of the quantum key thereby determining that the final state of each q-bit is the native determined polarization state or its relative phasing state (as the same example explained with FIGS. 2A-2C).

Still referring to FIG. 1B, moreover, in an embodiment, in order to facilitate the distribution of a quantum authentication key, the quantum-key-distribution module M102 is implemented including the following operations: performing a Bell test to determine the local realism of a quantum key for confirming that there is no unknown variable to interfere with the local system; distributing a quantum key formed with a combination of multiple single pure polarization states (as the same example explained with FIGS. 2A-2C) wherein the quantum key is delivered by single photons within a single optical channel; and distributing a quantum key formed with a combination of multiple q-bits expressing for mixed polarization states (as the same example explained with FIGS. 2A-2C).

Figure 3:
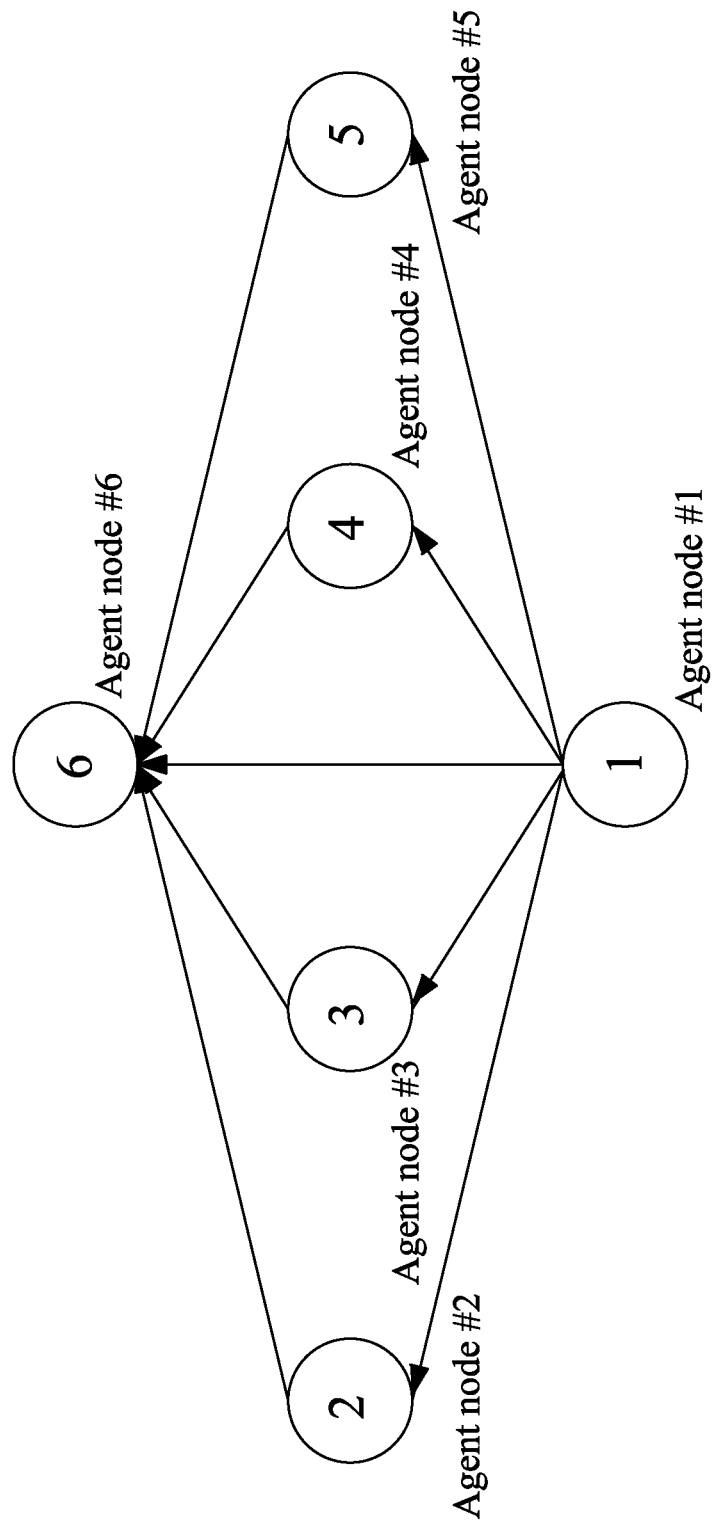
FIG. 3 is a demonstration diagram of multiple paths for data transmissions distributed by a transaction according to an embodiment of the present invention.

Still referring to FIG. 1B, moreover, in the same embodiment, in order to facilitate quantum authentication processes with transactions regarding data transmissions, the consensus-record module M103 of each agent node is implemented including the following operations: utilizing a quantum random number as a parameter to derive a plurality of paths based on a consensus mechanism provided by the EVM sub-system S1001 and a data will be distributed into the paths for transmissions from an agent node to another agent node (also referring to FIG. 3, for example, deriving four paths including node #1-node #2-node #6, node #1-node #3-node #6, node #1-node #4-node #6, and node #1-node #5-node #6 for data transmissions from node #1 to node #6); collaborating with the polarization-state-generator module M101 to get a quantum key formed with a combination of multiple pure single polarization states as an authentication key for data transmissions and coupled to the quantum-key-distribution module M102 to distribute the authentication key to each agent node on the paths for transmissions from a source agent node to another destination agent node (as the same example explained with FIGS. 2A-2C); collaborating with the polarization-state-generator module M101 to get a quantum key formed with a combination of multiple pure single polarization states for deriving a mixed state to be an authentication key for data transmissions and coupled to the quantum-key-distribution module M102 to distribute the authentication key to each agent node on the paths for transmissions from a source agent node to another destination agent node, wherein the corresponding coefficient to each single pure state of the mixed state is determined by a normalization process according to corresponding observed probabilities (as the same example explained with FIGS. 2A-2C); for the authentication key formed with single pure polarization states, performing a consensus mechanism according to a configured partition length to convert the authentication key into a form of Bell states, so as to express the form with binary bits as a parameter to be processed with a corresponding data block based on a configured block size (as the same example explained with FIGS. 2D-2F), thereby getting a hash value to be recorded on a transaction-verification hash table M104 maintained by each agent node; for the authentication key formed with a mixed polarization state, according to a configured partition length, performing a consensus mechanism to derive a linear combination of probabilities based on the mixed polarization state, so as to be processed with a corresponding data block based on a configured block size, thereby getting an eigen value (as the same example explained with FIGS. 2A-2C) to be expressed as a hash value recorded on a transaction-verification hash table M104 maintained by each agent node; performing a consensus mechanism to derive a Shannon entropy corresponding to a data block based on a configured block size for the data transmission of a transaction, and the Shannon entropy will be recorded in a transaction-Shannon entropy table M105 maintained by each agent node; and via tracing the transaction-verification hash table M104 and the transaction-Shannon entropy table M105, determining whether or not a data block of data transmission between agent nodes based on a consensus mechanism was tampered with.

Still in the same embodiment, in order to facilitate determining whether or not to retransmit a data block, recover a data block, or cancel a corresponding data transmission, each agent node is enhanced by: determining to retransmit a data block for a transaction of data transmission if a corresponding transaction-verification hash is mismatched and a Shannon entropy of the corresponding data block encoded by Huffman code was changed within a threshold range during a transmission; determining to recover a data block for a transaction of data transmission if a corresponding transaction-verification hash is mismatched and a Shannon entropy of the corresponding data block encoded by Huffman code was changed over a threshold range during a transmission; and if a corresponding transaction-verification hash keeps being mismatched meanwhile a Shannon entropy of the corresponding data block encoded by Huffman code keeps being changed over a threshold range during re-transmissions, determining to cancel a transaction of data transmission and replace the current configured data encoding based on a consensus mechanism. Referring to FIG. 1B again, thereby the consensus-record module M103 will be capable of checking with the transaction-verification hash table M104 and the transaction-Shannon entropy table M105, so as to get the feedback from M104 and M105 to facilitate determining a proper reaction timely for current transmission status.

What is claimed is:

1. A quantum block-chained authentication system for data transmission passing through a peer-to-peer (P2P) network including a plurality of agent nodes; wherein each agent node implements an Ethereum Virtual Machine (EVM) sub-system and a Quantum Processing Unit (QPU) integration sub-system; wherein the EVM sub-system performs quantum authentication processes with Quantum Key Distribution (QKD) application for transactions regarding data transmissions from an agent node to another agent node, and the QPU integration sub-system is coupled to the EVM sub-system and supports applicable quantum computing for the quantum authentication processes; wherein the QPU integration sub-system comprises:
   a quantum-computing-simulation module which provides a corresponding Quantum Processing Unit (QPU) service according to data encoding length based on Huffman coding for facilitating quantum computing;
   a quantum-circuits-simulation module which provides a neuro network implemented with q-bits for simulating variation of a Shannon entropy regarding to data blocks to be transmitted from an agent node to another agent node; and
   a quantum-machine-learning module which implements machine learning with high performance quantum-circuits simulators to collaborate with the quantum-circuits-simulation module for inferring malicious behavior based on the simulated variation of a Shannon entropy;
wherein the quantum block-chained authentication system is capable of performing a smart contract on an EVM mechanism for transmitting a data from an agent node to another agent node passing through a plurality of paths in a secure way with quantum authentication processes and detecting malicious behavior within a transmission in time;
wherein in order to perform the quantum authentication processes effectively, the EVM sub-system comprises:
   a polarization-state-generator module for the agent node to generate a set of polarization states as a component of a quantum key to be distributed;
   a quantum-key-distribution module for distributing the quantum key derived from the polarization-state-generator module via utilizing a generic QKD protocol while the quantum key is delivered by single photons within a single optical channel;
   a consensus-record module for the agent node to perform the quantum authentication processes according to a consensus mechanism of the EVM sub-system thereby updating an authentication result to a transaction-authentication hash table in order to determine whether a transmitted data was tampered with in time; and
   a quantum-key-update module collaborating with the polarization-state-generator module to update the quantum key before starting a new transaction or after determining that a transmitted data was tampered with.

2. The authentication system for data transmission passing through a P2P network according to claim 1, wherein in order to enhance the derivation of quantum state for an authentication key, the polarization-state-generator module is implemented including the following operations:
   for each q-bit of a quantum key to be derived, utilizing a true random number generator to determine a polarization state from multiple candidate polarization pure states and then set the determined polarization state into the current q-bit; and
   for a set of native determined q-bits of a quantum key to be derived, utilizing a Dirichlet-distribution-function generator to derive a series of numbers expressed for probabilities according to the length of the quantum key thereby determining that the final state of each q-bit is the native determined polarization state or its relative phasing state.

3. The authentication system for data transmission passing through a P2P network according to claim 1, wherein in order to facilitate the distribution of a quantum authentication key, the quantum-key-distribution module is implemented including the following operations:
   performing a Bell test to determine the local realism of a quantum key for confirming that there is no unknown variable to interfere with the local system;
   distributing a quantum key formed with a combination of multiple single pure polarization states wherein the quantum key is delivered by single photons within a single optical channel; and
   distributing a quantum key formed with a combination of multiple q-bits expressing for mixed polarization states.

4. The authentication system for data transmission passing through a P2P network according to claim 1, wherein in order to facilitate quantum authentication processes with transactions regarding to data transmissions, the consensus-record module of each agent node is implemented including the following operations:
   utilizing a quantum random number as a parameter to derive a plurality of paths based on a consensus mechanism provided by the EVM sub-system and a data will be distributed into the paths for transmissions from an agent node to another agent node;
   collaborating with the polarization-state-generator module to get a quantum key formed with a combination of multiple pure single polarization states as an authentication key for data transmissions and coupled to the quantum-key-distribution module to distribute the authentication key to each agent node on the paths for transmissions from a source agent node to another destination agent node;

collaborating with the polarization-state-generator module to get a quantum key formed with a combination of multiple pure single polarization states for deriving a mixed state to be an authentication key for data transmissions and coupled to the quantum-key-distribution module to distribute the authentication key to each agent node on the paths for transmissions from a source agent node to another destination agent node, wherein the corresponding coefficient to each single pure state of the mixed state is determined by a normalization process according to corresponding observed probabilities;

for the authentication key formed with single pure polarization states, performing a consensus mechanism according to a configured partition length to convert the authentication key into a form of Bell states, so as to express the form with binary bits as a parameter to be processed with a corresponding data block based on a configured block size, thereby getting a hash value to be recorded on a transaction-verification hash table maintained by each agent node;

for the authentication key formed with a mixed polarization state, according to a configured partition length, performing a consensus mechanism to derive a linear combination of probabilities based on the mixed polarization state, so as to be processed with a corresponding data block based on a configured block size, thereby getting an eigen value to be expressed as a hash value recorded on a transaction-verification hash table maintained by each agent node;

performing a consensus mechanism to derive a Shannon entropy corresponding to a data block based on a configured block size for the data transmission of a transaction, and the Shannon entropy will be recorded in a transaction-Shannon entropy table maintained by each agent node; and via tracing the transaction-verification hash table and the transaction-Shannon entropy table, determining whether a data block of data transmission between agent nodes based on a consensus mechanism was tampered with.

5. The authentication system for data transmission passing through a P2P network according to claim 4, wherein in order to facilitate determining whether a data block of data transmission between agent nodes based on a consensus mechanism was tampered with, the consensus-record module of each agent node further provides the following operations:

determining to retransmit a data block for a transaction of data transmission if a corresponding transaction-verification hash is mismatched and a Shannon entropy of the corresponding data block encoded by Huffman code was changed within a threshold range during a transmission;

determining to recover a data block for a transaction of data transmission if a corresponding transaction-verification hash is mismatched and a Shannon entropy of the corresponding data block encoded by Huffman code was changed over a threshold range during a transmission; and if a corresponding transaction-verification hash keeps being mismatched meanwhile a Shannon entropy of the corresponding data block encoded by Huffman code keeps being changed over a threshold range during re-transmissions, determining to cancel a transaction of data transmission and replace the current configured data encoding based on a consensus mechanism.

6. A quantum block-chained authentication method for data transmission passing through a peer-to-peer (P2P) network including a plurality of agent nodes, the quantum block-chained authentication method comprising:

configuring each agent node as a chained virtual machine attached on a specific P2P network;

implementing a consensus mechanism for each chained virtual machine, wherein the consensus mechanism is capable of performing transactions of data transmission between the agent nodes;

performing a set of quantum authentication processes while receiving a data block distributed for a data transmission which is launched by a transaction based on the consensus mechanism; and determining whether to retransmit a data block, recover a data block, or cancel a corresponding data transmission, in accordance with the results derived from the quantum authentication processes;

wherein the set of quantum authentication processes comprises:

for each q-bit of a quantum key to be derived, adopting a true random number to determine a corresponding state from a plurality of candidate pure quantum states and then set the determined state into the current q-bit, thereby getting a combination of pure quantum states;

for a set of native determined q-bits of a quantum key to be derived, utilizing a Dirichlet distribution function to derive a series of numbers expressed for probabilities according to the length of the quantum key so as to determine whether the final state of each q-bit is the native determined quantum state or its relative phasing state, thereby getting another combination of pure quantum states;

utilizing a combination of pure quantum states to form a quantum key including a set of q-bits expressed as a set of pure single quantum states standing for a mixed quantum state;

performing a Bell test to determine the local realism of a quantum key for confirming that there is no unknown variable to interfere with the local system;

adopting a quantum key as an authentication key and distributing the authentication key from a source agent node to a destination agent node via utilizing a generic QKD protocol while the authentication key is delivered by single photons within a single optical channel;

for the authentication key formed with single pure quantum states, performing a consensus mechanism according to a configured partition length to convert the authentication key into a form of Bell states, so as to express the form with binary bits as a parameter to be processed with a corresponding data block based on a configured block size, thereby getting a hash value to be recorded on a transaction-verification hash table maintained by each agent node;

for the authentication key formed with a mixed quantum state, according to a configured partition length, performing a consensus mechanism to derive a linear combination of probabilities based on the mixed quantum state, so as to be processed with a corresponding data block based on a configured block size, thereby getting an eigen value to be expressed as a hash value recorded on a transaction-verification hash table maintained by each agent node;

performing a consensus mechanism to derive a Shannon entropy corresponding to a data block based on a configured block size and the Shannon entropy will be recorded in a transaction-Shannon entropy table maintained by each agent node; and via tracing the transaction-verification hash table and the transaction-Shannon entropy table, determining whether a data block distributed by a data transmission launched by a transaction based on a consensus mechanism was tampered with.

7. The authentication method for data transmission passing through a peer-to-peer (P2P) network including a plurality of agent nodes according to claim 6, wherein in order to facilitate determining whether to retransmit a data block, recover a data block, or cancel a corresponding data transmission, the authentication method further comprising:

determining to retransmit a data block for a transaction of data transmission if a corresponding transaction-verification hash is mismatched and a Shannon entropy of the corresponding data block encoded by Huffman code was changed within a threshold range during a transmission;

determining to recover a data block for a transaction of data transmission if a corresponding transaction-verification hash is mismatched and a Shannon entropy of the corresponding data block encoded by Huffman code was changed over a threshold range during a transmission; and if a corresponding transaction-verification hash keeps being mismatched meanwhile a Shannon entropy of the corresponding data block encoded by Huffman code keeps being changed over a threshold range during re-transmissions, determining to cancel a transaction of data transmission and replace the current configured data encoding based on a consensus mechanism.

* * * * *